US007791627B2

(12) United States Patent
Sakurai et al.

(10) Patent No.: US 7,791,627 B2
(45) Date of Patent: Sep. 7, 2010

(54) PRINTER

(75) Inventors: Hiroshi Sakurai, Tokorozawa (JP); Masahiko Ueda, Musashino (JP); Seiji Morita, Sayama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 858 days.

(21) Appl. No.: 11/631,971

(22) PCT Filed: Apr. 21, 2006

(86) PCT No.: PCT/JP2006/308441

§ 371 (c)(1),
(2), (4) Date: Jan. 9, 2007

(87) PCT Pub. No.: WO2006/120870

PCT Pub. Date: Nov. 16, 2006

(65) Prior Publication Data

US 2008/0062240 A1 Mar. 13, 2008

(30) Foreign Application Priority Data

May 9, 2005 (JP) ............................ 2005-136441

(51) Int. Cl.
*B41J 11/00* (2006.01)
*G01D 15/24* (2006.01)

(52) U.S. Cl. ...................... 347/219; 347/171; 347/215; 347/217; 347/218; 347/220; 347/222; 400/223; 400/225; 400/611; 400/618

(58) Field of Classification Search ................. 347/171, 347/215, 217, 218, 219, 220, 222; 400/223, 400/225, 611, 618
See application file for complete search history.

(56) References Cited

U.S. PATENT DOCUMENTS 5,072,238 A * 12/1991 Takamiya et al. ........... 347/198
5,430,522 A * 7/1995 Kobayashi et al. ............ 355/27
5,499,878 A * 3/1996 Morgavi ..................... 400/223
5,820,280 A * 10/1998 Fox ........................... 400/611
7,307,648 B2 * 12/2007 Yokoyama et al. .......... 347/219
7,315,316 B2 * 1/2008 Kitamura et al. ............ 347/171
2002/0167582 A1 * 11/2002 Onozato et al. ............. 347/219

FOREIGN PATENT DOCUMENTS

JP 53-19900 2/1978
JP 62-113581 5/1987
JP 2-99657 8/1990
JP 3-173664 7/1991
JP 11-342661 12/1999

OTHER PUBLICATIONS

PCT Notification of Transmittal of Translation of the International Preliminary Examination Report (Form PCT/IB/338) dated Jan. 2004.
PCT International Preliminary Report on Patentability (Form PCT/IB/373) dated Jan. 2004.
Translation of Written Opinion of the International Searching Authority (PCT/ISA/237) dated Apr. 2005.

* cited by examiner

*Primary Examiner*—Ryan Lepisto
(74) *Attorney, Agent, or Firm*—Smith, Gambrell & Russell, LLP

(57) ABSTRACT

A ribbon supply shaft drive motor (8) and a ribbon take-up shaft drive motor (10) are drivingly controlled separately. If the state of a ribbon is not changed after a control cycle is repeated for a set time, the rotational speed of the drive motors (8, 10) is increased step by step.

6 Claims, 6 Drawing Sheets

PRINTER

TECHNICAL FIELD

The present invention relates to a ribbon feeder of a printer that utilizes an ink ribbon.

BACKGROUND ART

In a printer that utilizes a ribbon (heat transfer film, ink ribbon, etc.), the ribbon and a paper sheet are fed in pressure contact between a head and a platen. If the tension of the ribbon varies as this is done, the feed of the ribbon is not concurrent with the feed of the paper sheet, so that the ribbon may be caused to rub against the paper sheet, thereby spoiling the print quality, in some cases. Various proposals have been made to solve this problem (see Japanese Patent Application Laid-Open No. 62-113581, Japanese Utility Model Application Laid-Open No. 2-99657, and Japanese Patent Application Laid-Open No. 11-342661).

In the invention described in Japanese Patent Application Laid-Open No. 62-113581, tension arms that are urged in a loosening direction of the ribbon and detectors for detecting the displacements of the tension arms are located between a ribbon supply shaft and a printing section (in a ribbon supply path) and between the printing section and a ribbon take-up shaft (in a ribbon take-up path). If displacements of the tension arms in the ribbon loosening direction are detected, a ribbon supply shaft drive motor is stopped or a ribbon take-up shaft drive motor is driven. If displacements of the tension arms in a ribbon tensioning direction are detected, on the other hand, the ribbon supply shaft drive motor is driven or the ribbon take-up shaft drive motor is stopped.

In the invention described in Jpn. UM Appln. KOKAI Publication No. 2-99657, an acting body that touches a ribbon and moves up and down as the ribbon tension changes and a sensor that detects a displacement of the acting body in a fixed position are provided in place of the tension arms. If the displacement of the acting body is in a loosening direction of the ribbon, a ribbon supply shaft drive motor is stopped or a ribbon take-up shaft drive motor is driven. If the displacement of the acting body is in a tensioning direction of the ribbon, on the other hand, the ribbon supply shaft drive motor is driven or the ribbon take-up shaft drive motor is stopped.

In the invention described in Japanese Patent Application Laid-Open No. 11-342661, a rotary encoder is provided for detecting the rotational angle of a ribbon core. The outside diameter of the ribbon is calculated from the number of steps of a stepping motor for conveyance and the number of output steps of the rotary encoder that are obtained when a label sheet and an ink ribbon are conveyed a predetermined distance by the stepping motor. The speed and torque of a ribbon driving DC motor are controlled in accordance with the calculated outside diameter of the ribbon.

In the inventions described in Japanese Patent Application Laid-Open No. 62-113581 and Japanese Utility Model Application Laid-Open No. 2-99657, a tensioned state of the ribbon is detected by the tension arms, and the ribbon supply shaft drive motor and the ribbon take-up shaft drive motor are driven or stopped based on outputs of the detectors that are turned on or off depending on the detected tensioned state. Although the construction is simple, therefore, the ribbon supply shaft drive motor and the ribbon take-up shaft drive motor cannot sharply start or stop rotation if they are DC motors. Thus, frequent repetition of drive for ribbon supply or drive for ribbon take-up cannot be dealt with, in some cases. Since the respective diameters of a ribbon supply roll and a take-up roll change, moreover, the motor speed for one cycle of take-up operation must actually be adjusted on each occasion, so that effective control is difficult. For this reason, furthermore, the ribbon supply shaft drive motor and the ribbon take-up shaft drive motor require a performance such that they can produce high starting torque despite the availability of low speed when the roll diameter is large and a performance such that they can start at high speed despite the availability of low starting torque when the roll diameter is small. In case where no mechanism is provided for directly detecting the roll diameter, however, a motor that meets those two requirements, that is, a motor that can start at high speed and also can produce high starting torque, is needed, but such a motor is expensive naturally.

In the invention described in Japanese Patent Application Laid-Open No. 11-342661, on the other hand, the ribbon diameter cannot be calculated unless the ribbon is conveyed a predetermined distance immediately after connection to the power supply or paper or ribbon replacement, although precision control can be achieved in principle. Therefore, the detection of the ribbon diameter takes time, so that the ribbon is used wastefully. If the feed rate is low or if forward feed and backward feed are repeated, moreover, the roll diameter may possibly fail to be detected or the detection may be inaccurate.

Accordingly, the object of the present invention is to provide a printer using a ribbon supply shaft drive motor and a ribbon take-up shaft drive motor, which are relatively low-cost and are expected only to be able to produce a torque that can be activated when a ribbon roll has its maximum diameter, and besides, being capable of practically precisely controlling the degree of tension of a ribbon.

DISCLOSURE OF THE INVENTION

A ribbon supply shaft drive motor and a ribbon take-up shaft drive motor are controlled separately. The control is performed in a very short control cycle (e.g., about 4 milliseconds). When the ribbon is tensioned in a ribbon supply path (between a ribbon supply shaft and a printing section), the ribbon supply shaft drive motor (stepping motor) is driven. When the ribbon is loose, this motor is stopped or kept in a stop state.

When the ribbon is tensioned in a ribbon take-up path (between the printing section and a ribbon take-up shaft), the ribbon take-up shaft drive motor (stepping motor) is stopped or kept in a stop state. When the ribbon is loose, this motor is driven. Either of the drive motors always starts with low speed and high torque of a first stage when it is driven. If the state of the ribbon is not changed even after the next control cycle is reached, the speed of rotation of the drive motor is increased so that a loose state and a tensioned state of the ribbon never fail to appear in the ribbon supply path and the take-up path, respectively.

According to the present invention, the ribbon feed is controlled by the tensioned and loose states only, so that it can be performed without being influenced by the diameter of the ribbon supply roll, the diameter of the ribbon take-up roll, or changes of those diameters. Thus, the ribbon feed can be kept in an appropriate state by a simple configuration without using any expensive parts, such as a rotary encoder.

Since the ribbon supply shaft drive motor and the ribbon take-up shaft drive motor always start at the first stage when they are activated, either motor is expected only to meet the starting torque requirement. After all, the available motor may be a relatively low-cost one that must only be able to produce a torque that can be activated when the ribbon roll has its maximum diameter.

BEST MODE FOR CARRYING OUT THE INVENTION

Figure 1:
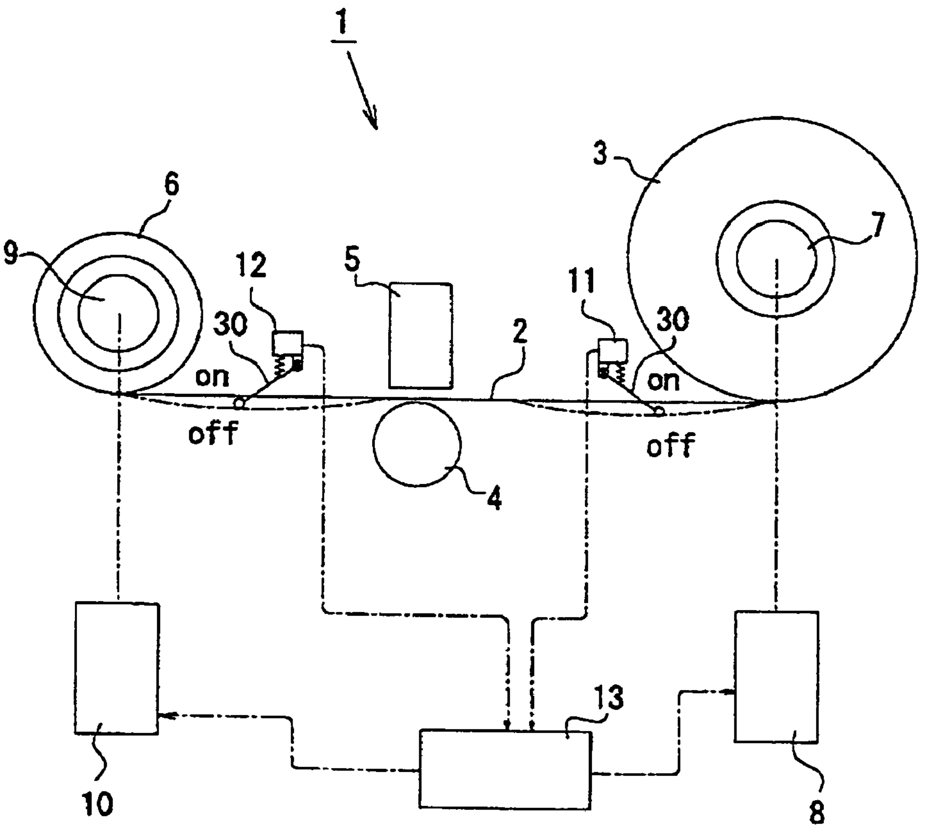
FIG. 1 is a diagram for illustrating an outline of a ribbon feeder of one embodiment of a printer according to the present invention.

A ribbon, along with a paper sheet, is fed at a constant speed from the supply side to the take-up side by a platen of a printing section. A path of travel of the ribbon can be divided between a ribbon supply path and a ribbon take-up path.

A state in which the ribbon is somewhat loose and a state in which the ribbon is tensioned to a certain degree are set in the ribbon supply path. Whether the ribbon is in the loose state or in the tensioned state is detected by tension arms of detectors that are located in the ribbon supply path, and a ribbon supply shaft drive motor is controlled.

The tension arms are located between a ribbon supply shaft and the printing section and between the printing section and a ribbon take-up shaft and are continually urged in the loosening direction of the ribbon. The detectors detect displacements of the tension arms caused by tension and relaxation of the ribbon and output on/off signals.

The control is performed in a very short control cycle (e.g., about 4 milliseconds). When the ribbon is loose, the ribbon supply shaft drive motor is stopped or kept in a stop state. When the ribbon is tensioned, the ribbon supply shaft drive motor is driven. The drive of the ribbon supply drive motor is always started with low speed and high torque of a first stage.

If the loose state is restored with the first-stage rotational speed, the ribbon supply shaft drive motor stops. If the loose state is also established in the next control cycle, the stop state is maintained.

If the tensioned state cannot be improved after a set time (e.g., 100 milliseconds) of repetition of the control cycle, however, the ribbon supply shaft drive motor is driven in a second stage such that the rotational speed is increased (e.g., set to a 5% higher speed). This situation may possibly occur if the diameter of a supply ribbon roll is reduced so that the amount of feed of the ribbon is short as compared with the delivery of the ribbon by the platen at a rotational frequency of the first stage, for example. If the tensioned state cannot be improved after the next set time (e.g., 100 milliseconds) of repetition of the control cycle, the motor is driven in a third stage such that the rotational speed is further increased.

Thus, the speed increase is repeated step by step every time the control cycle is repeated for the set time (e.g., 100 milliseconds) so that the loose state is established. If the loose state is restored, the ribbon supply shaft drive motor is stopped as aforesaid. If the tensioned state is resumed, the ribbon supply shaft drive motor is driven from the first stage.

The speed of the ribbon supply shaft drive motor is increased by adjusting the delivery interval (frequency) of pulses supplied to the motor. The speed is increased in about three stages. The rotational speed of the ribbon supply shaft drive motor in the third stage is set so that the resulting ribbon feed speed is a little higher than the speed of ribbon feed by the platen. By doing this, the loose state can be restored securely. If the loose state fails to be restored nonetheless, some special situation, such as the attainment of a ribbon end, can be supposed to have occurred, so that the drive of the platen is stopped.

In the case of the ribbon take-up shaft drive motor, the reaction of the motor drive to the output of the detector is reverse. Specifically, the ribbon take-up shaft drive motor is started when the ribbon is in the loose state. When the ribbon is in the tensioned state, the ribbon take-up shaft drive motor is stopped or kept in a stop state. As in the case of the ribbon supply shaft drive motor, the motor is started with the first stage, and its speed is increased step by step until the loose state is canceled.

First, a construction of one embodiment of a printer according to the present invention will be described with reference to FIGS. 1 to 4.

FIG. 1 schematically shows an outline of a printer 1, laying stress the feed of a ribbon 2. The ribbon 2 is a heat transfer film ribbon, which is drawn out of a ribbon supply roll 3, passed between a platen 4 and a print head 5 (printing section), and wound up by a ribbon take-up roll 6. The ribbon supply roll 3 is mounted on a ribbon supply shaft 7. The ribbon supply shaft 7 is connected to a ribbon supply shaft drive motor 8. Likewise, the ribbon take-up roll 6 is mounted on a ribbon take-up shaft 9. The ribbon take-up shaft 9 is connected to a ribbon take-up shaft drive motor 10.

The ribbon 2, along with a paper sheet, is fed at a constant speed from the supply side to the take-up side by the platen 4 in the printing section. For the feed of the ribbon 2, a ribbon supply path extends between the ribbon supply shaft 7 and the printing section, while a ribbon take-up path extends between the printing section and the ribbon take-up shaft.

A first ribbon state detector 11 is located in the ribbon supply path, while a second ribbon state detector 12 is located in the ribbon take-up path. Both these detectors 11 and 12 detect the tension and relaxation of the ribbon 2 in their respective paths. They transmit an on-signal for the tensioned state or an off-signal for the loose state to a control system of a control unit 13 (provided in the body of the printer) for the ribbon supply shaft drive motor 8 and the ribbon take-up shaft drive motor 10. The ribbon supply shaft drive motor 8 and the ribbon take-up shaft drive motor 10 can produce a torque that can be activated when the ribbon roll has its maximum diameter (e.g., with an outside diameter of 80 millimeters, width of 4 inches, and weight of 470 g), and are under the control of the control unit 13.

Figure 2:
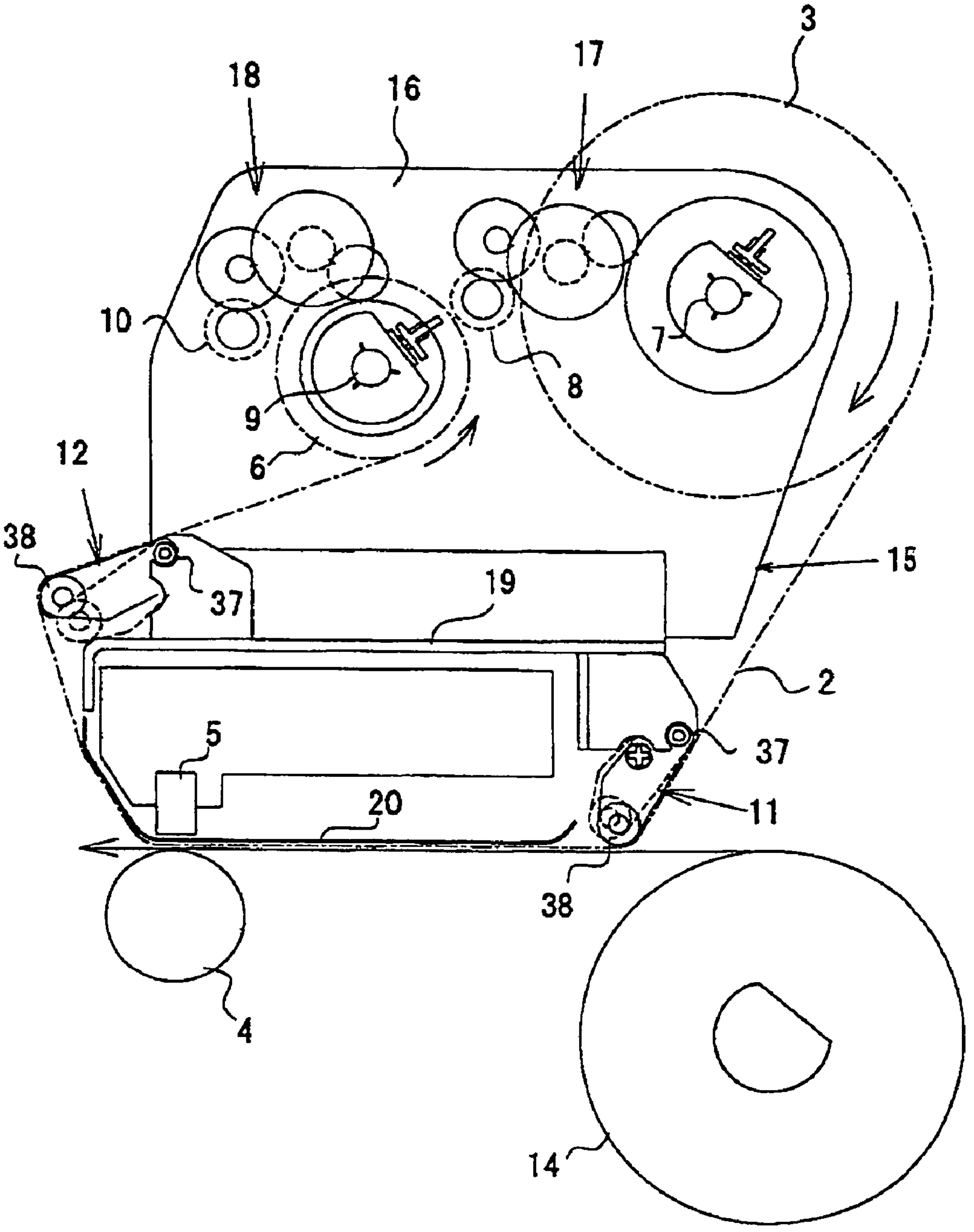
FIG. 2 is a schematic side view showing a layout of individual elements according to the one embodiment of the printer according to the present invention.

FIG. 2 is a schematic side view systematically showing an actual layout of the ribbon supply roll 3, platen 4, print head 5, first ribbon state detector 11, and second ribbon state detector 12 of the printer 1. Numeral 14 denotes a paper roll. In printing, the paper sheet is fed together with the ribbon 2 in the direction of the arrow by the platen 4.

A frame 15 is composed of a baseplate 19 and a vertical wall 16. The vertical wall 16 is fitted with the ribbon supply shaft 7 on the upstream side of the platen 4 with respect to a ribbon running direction, and moreover, with the ribbon take-up shaft 9 on the downstream side of the platen 4 with respect to the ribbon running direction. The ribbon supply roll 3 is mounted on the ribbon supply shaft 7, and the ribbon take-up roll 6 on the ribbon take-up shaft 9. The ribbon supply shaft 7 is driven through a gear train 17 by the ribbon supply shaft drive motor 8 that is mounted on the rear side of the vertical wall 16. The ribbon take-up shaft 9 is driven and rotated through a gear train 18 by the ribbon take-up shaft drive motor 10 that is also mounted on the rear side of the vertical wall 16.

The baseplate 19 of the frame 15 is placed on a horizontal surface. The first ribbon state detector 11 is mounted on the lower surface of a rear part (on the upstream side with respect to the ribbon running direction) of the baseplate 19, while the second ribbon state detector 12 is mounted on the upper surface of a front part (on the downstream side) of the baseplate 19.

The ribbon 2 wound on the ribbon supply roll 3 passes through a ribbon path, which extends along the first ribbon state detector 11, a ribbon guide plate 20, and the second ribbon state detector 12, and reaches the ribbon take-up roll 6. The print head 5 and the platen 4 are located opposite each other in the middle of the ribbon path, and the feed of the ribbon 2 and the paper sheet and printing are performed in this position. In this embodiment, the print head 5 is a thermal head.

Figure 3:
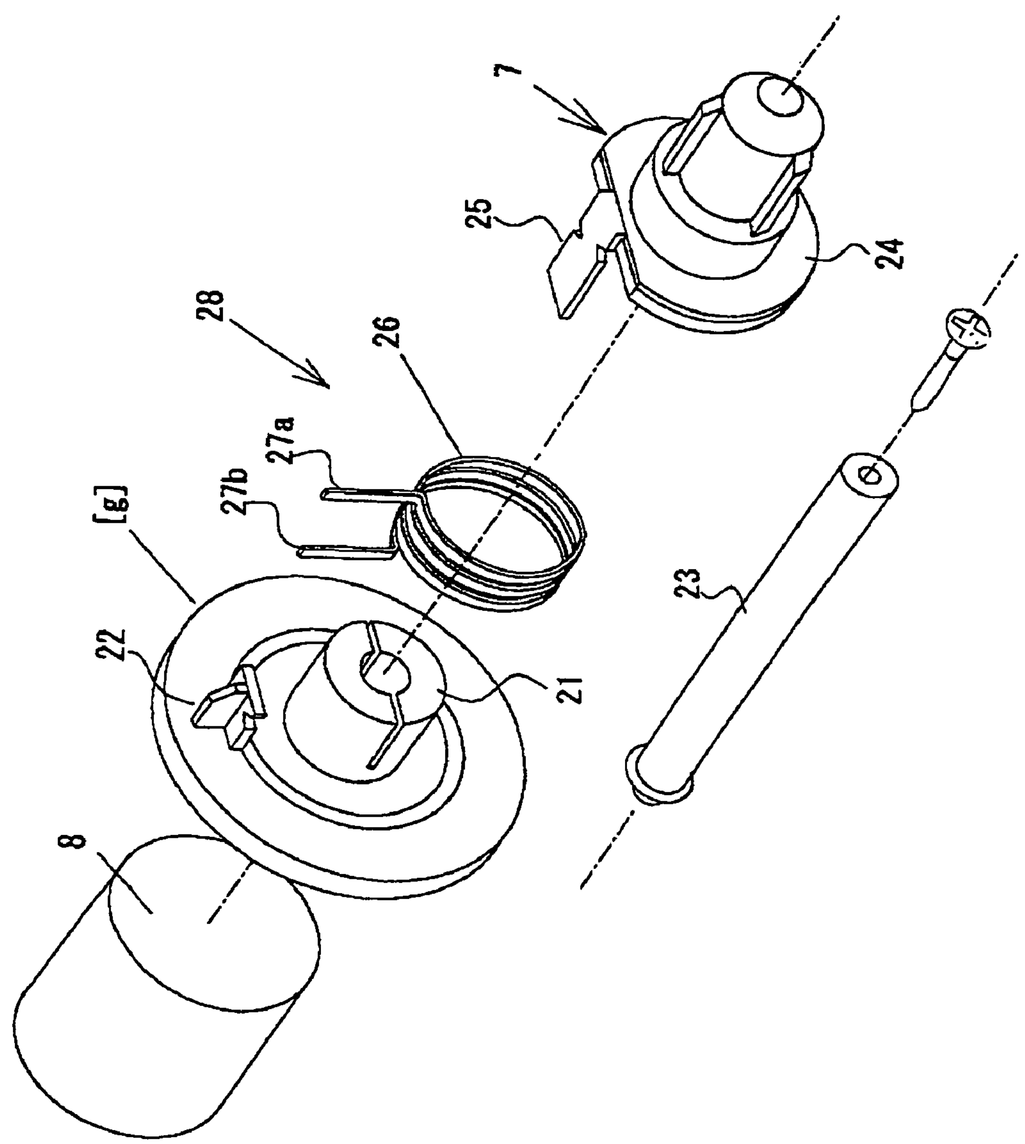
FIG. 3 is an exploded perspective view showing a damper structure of a ribbon supply shaft used in the printer of FIG. 2.
Figure 4:
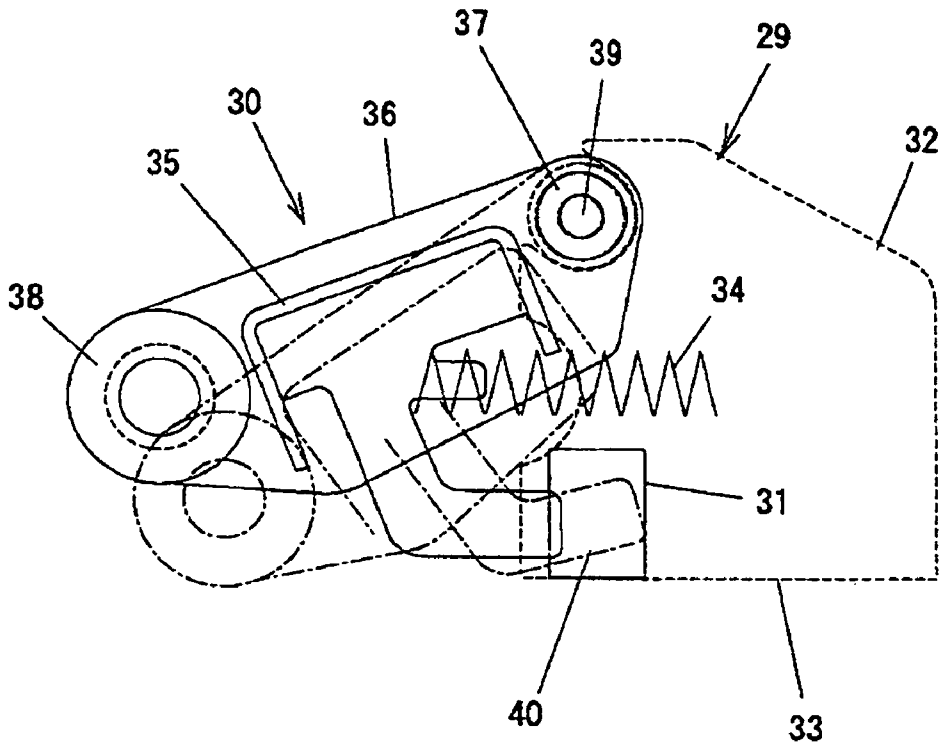
FIG. 4 is a side view showing a construction of a second ribbon supply state detector used in the printer of FIG. 2.

As shown in FIG. 3, the ribbon supply shaft 7 is coupled through a damper structure to a supply-side drive shaft 21 that is integral with a last gear [g] of the gear train 17. An engaging portion 22 is formed so as to project from a part of the peripheral edge of the gear [g] toward the inside with respect to the axial direction. On the other hand, an engaged portion 25 is formed so as to project outward in an axial direction from a part of the outer edge of a collar 24 of the ribbon supply shaft 7. The ribbon supply shaft 7 is rotatably fitted on the supply-side drive shaft 21. The supply-side drive shaft 21 and the ribbon supply shaft 7 are supported for rotation by a fixed shaft 23 that is fixed to the vertical wall 16.

A spiral spring 26 is located between the supply-side drive shaft 21 and the ribbon supply shaft 7. As shown in FIG. 3, the opposite end portions of the spiral spring 26 are bent so as to extend radially outward in the same position on the circumference of a circle and form abutting portions 27*a* and 27*b*, individually. The abutting portions 27*a* and 27*b* engage the engaging portion 22 of the supply-side drive shaft 21 and the engaged portion 25 of the ribbon supply shaft 7, individually, and constitute a torque damper 28.

The ribbon take-up shaft 9 has the same structure as the ribbon supply shaft 7 shown in FIG. 3. Specifically, a spiral spring (having the same structure as the spiral spring 26 of FIG. 3) is located between the ribbon take-up shaft 9 and its take-up-side drive shaft (having the same structure as the supply-side drive shaft 21 of FIG. 3), and the opposite ends of the spiral spring are bent radially outward to form a torque damper.

The first ribbon state detector 11 and the second ribbon state detector 12 have the same structure. The following is a description of only the second ribbon state detector 12.

The second ribbon state detector 12 (FIG. 4) comprises a base member 29 for mounting the detector 12 on the baseplate 19 of the frame 15, a lever body 30, and a photo-interrupter 31 for use as an on/off switch. The detector 12 has a general shape that extends long in a direction perpendicular to the drawing sheet of FIG. 4, and its length in the extend direction is a little greater than the widths of the paper sheet and the ribbon 2.

The base member 29 is a member with a U-shaped cross section, in which a flat plate portion 33 in the center and support walls 32 on the opposite sides are formed by bending the longitudinally opposite sides of a press-molded steel plate in the same direction. A basal part of the lever body 30 is pivotally supported on the respective front ends of the support walls 32 so that it can rock in the vertical direction and is continually urged to rock in the clockwise direction (vertical direction) of FIG. 4 by an urging spring 34. On the other hand, the photo-interrupter 31 is fixed to the flat plate portion 33.

The lever body 30 comprises a bar member 35, shaft supporting members 36, a first roller 37, and a second roller 38. The bar member 35 is a strong member with a U-shaped cross section that opens downward, and the shaft supporting members 36 are fixed individually to its opposite ends. The first roller 37 and the second roller 38 are arranged between one of the shaft supporting members 36 and the other shaft supporting member 36. The first roller 37 is rotatably supported on the proximal side (upper side) of the shaft supporting members 36, while the second roller 38 is rotatably supported on the distal end side (lower side) of the shaft supporting members 36.

The lever body 30 is mounted for vertical rocking motion around a rocking shaft 39 on the proximal side of the shaft supporting members 36. The rocking shaft 39 is located concentrically with a rotating shaft of the first roller 37. Further, a shield member 40 is fixed to the bar member 35, corresponding to the photo-interrupter 31 that is mounted on the flat plate portion 33 of the base member 29.

If the distal end portion of the lever body 30 is depressed, therefore, the lever body 30 rocks downward (or in the counterclockwise direction of FIG. 4) around the rocking shaft 39. If the press is removed, on the other hand, the lever body 30 is moved upward (in the clockwise direction of FIG. 4) by the spring 34, whereupon it returns to its original position. Thus, the lever body 30 acts as a tension arm, while the photo-interrupter 31 and the shield member 40 act as detectors. The photo-interrupter 31 is turned on when the lever body 30 is rocked downward and turned off when the lever body 30 is rocked upward.

In the first ribbon state detector 11, as shown in FIG. 2, the first roller 37 and the second roller 38 are located above and below, respectively, on the underside of the rear end (on the upstream side with respect to the ribbon travel) of the baseplate 19 so that the ribbon 2 is in contact with both the first roller 37 and the second roller 38 and that the second roller 38 is continually urged toward the outside of the ribbon path.

In the second ribbon state detector 12, as shown in FIG. 2, the first roller 37 and the second roller 38 are located back and forth, respectively, on the topside of the front end (on the downstream side with respect to the ribbon travel) of the baseplate 19 so that the ribbon 2 is in contact with both the second roller 38 and the first roller 37 and that the second roller 38 is continually urged toward the outside of the ribbon path.

The following is a description of the operation of the printer according to the present invention.

The ribbon 2 and the paper sheet are set in the printer 1. Both the first roller 37 and the second roller 38 are in contact with the ribbon 2 in the spots of the first and second ribbon state detectors 11 and 12. Specifically, in the ribbon path, both the respective first rollers 37 of the ribbon state detectors 11 and 12 form bending points of the ribbon path. If the tension of the ribbon 2 changes, the lever body 30 rocks around the first rollers 37 depending on the magnitude of the tension, thereby turning the photo-interrupter 31 on or off.

If a print signal is applied to the printer 1 in this state, the ribbon 2 is fed together with the paper sheet at a constant speed.

In this ribbon supply path, at this point of time, the ribbon 2 is drawn into the side of the platen 4, so that the torque damper 28 (FIG. 3) of the ribbon supply shaft 7 is tightened, whereupon the tension of the ribbon 2 increases to cause the first ribbon state detector 11 to rotate in the clockwise direction of FIG. 2. In the end, the photo-interrupter 31 is turned on (so that light transmission through the photo-interrupter 31 is interrupted). In consequence, the ribbon supply shaft drive motor 8 is driven to rewind the torque damper 28 so that the ribbon 2 loosens.

Thereupon, the lever body 30 of the first ribbon state detector 11 is rotated in the counterclockwise direction of FIG. 2 by the urging force of the urging spring 34, whereby the photo-interrupter 31 is turned off. Thus, in the ribbon supply path, the ribbon supply shaft drive motor 8 is driven if the tension of the ribbon 2 becomes excessive. If the ribbon 2 loosens to a certain or higher degree, the ribbon supply shaft drive motor 8 is stopped. This control is repeated in cycles of about 4 milliseconds so that the ribbon feed in the ribbon supply path is appropriately maintained.

If the excessive tension of the ribbon 2 fails to be eliminated in one control cycle, the detection of the first ribbon state detector 11 is kept on, so that the ribbon supply shaft drive motor 8 continues its drive. The rotational frequency of the ribbon drive motor is programmed to be increased by 5% if the excessive tension of the ribbon 2 fails to be eliminated when the control cycle is repeated for 100 milliseconds.

Thus, the speed of rotation of the ribbon supply shaft drive motor 8 is increased step by step at every set time (100 milliseconds) unless the excessive tension of the ribbon 2 is eliminated. In the end, therefore, the amount of feed of the ribbon by the ribbon supply shaft drive motor 8 exceeds the delivery by the platen, whereupon the first ribbon state detector 11 is tuned off, and the ribbon supply shaft drive motor 8 stops. If the first ribbon state detector 11 is not turned off even when the speed of rotation of the ribbon supply shaft drive motor 8 is increased to a set stage (normally to a third stage), however, an abnormal situation, such as the attainment of a ribbon end, can be supposed to have occurred, so that the control unit 13 issues an alarm to stop the drive of the platen 4.

If the ribbon supply shaft drive motor 8 is left stopped, the tension of the ribbon 2 never fails to be excessive, so that the ribbon supply shaft drive motor 8 rotates to supply the ribbon 2.

If any abnormal situation such as ribbon snapping occurs, the first ribbon state detector 11 can never be turned on. Therefore, the ribbon supply shaft drive motor 8 is kept stopped even when the control cycle is repeated for the set time. On the take-up path side, in this case, the output of the second ribbon state detector 12 cannot be turned on, so that the take-up shaft drive motor continues to rotate. If the output of the second ribbon state detector 12 is not turned on even when the control cycle is repeated for the set time under the control on the take-up path side, therefore, the control unit 13 issues an alarm to stop the drive of a motor that drives the platen 4 and the drive of the ribbon take-up shaft drive motor 10.

In this manner, shocks caused at the time of start and stop of the ribbon supply shaft drive motor 8 can be eased by the torque damper 28, so that the ribbon feed is smooth.

Since the ribbon 2 is fed from the side of the platen 4 into the ribbon take-up path, the torque damper 28 of the ribbon take-up shaft 9 is rewound, so that the tension of the ribbon 2 lowers, whereupon the lever body 30 of the second ribbon state detector 12 is rotated clockwise as viewed in FIG. 2 (or upward). In the end, the photo-interrupter 31 is turned off. Accordingly, the ribbon take-up shaft motor 9 is driven to tighten the torque damper 28, thereby increasing the tension of the ribbon 2.

Thereupon, the lever body 30 of the second ribbon state detector 12 is rotated counterclockwise as viewed in FIG. 2 (or downward) around the position of the first roller 37 by the tension of the ribbon 2, whereby the photo-interrupter 31 is turned on to stop the rotation of the ribbon take-up shaft drive motor 9.

Thus, if the tension of the ribbon 2 is excessive in the ribbon take-up path, the ribbon take-up shaft drive motor 9 is stopped. If the ribbon 2 loosens to a certain or higher degree, on the other hand, the ribbon take-up shaft drive motor 9 is driven. The ribbon feed in the ribbon take-up path is appropriately maintained by repeating the drive and stop of the ribbon take-up shaft drive motor 9 in cycles of about 4 milliseconds, as in the aforementioned case.

If the output of the second ribbon state detector 12 is not turned off even when the control cycle is repeated for the set time after the rotation of the ribbon take-up shaft drive motor 9 is stopped, an abnormal situation, such as the attainment of a ribbon end, can be supposed to have occurred. If the output of the second ribbon state detector 12 fails to be turned on although the ribbon take-up shaft drive motor is rotating at a rotational frequency of a final stage, on the other hand, an abnormal situation, such as ribbon snapping, can be supposed to have occurred. In the case of the attainment of a ribbon end or some other abnormal situation, the ribbon take-up shaft drive motor 10 remains stopped. In this case, no signal is issued to stop the ribbon supply shaft drive motor 8 on the ribbon supply path side, so that the ribbon supply shaft drive motor 8 continues to rotate. If the output of the first ribbon state detector 11 is not turned off even when the control cycle is repeated for the set time, however, the control unit 13 issues an alarm to stop the drive of the motor for the platen 4 and the drive of the ribbon supply shaft drive motor 8.

Figure 5:
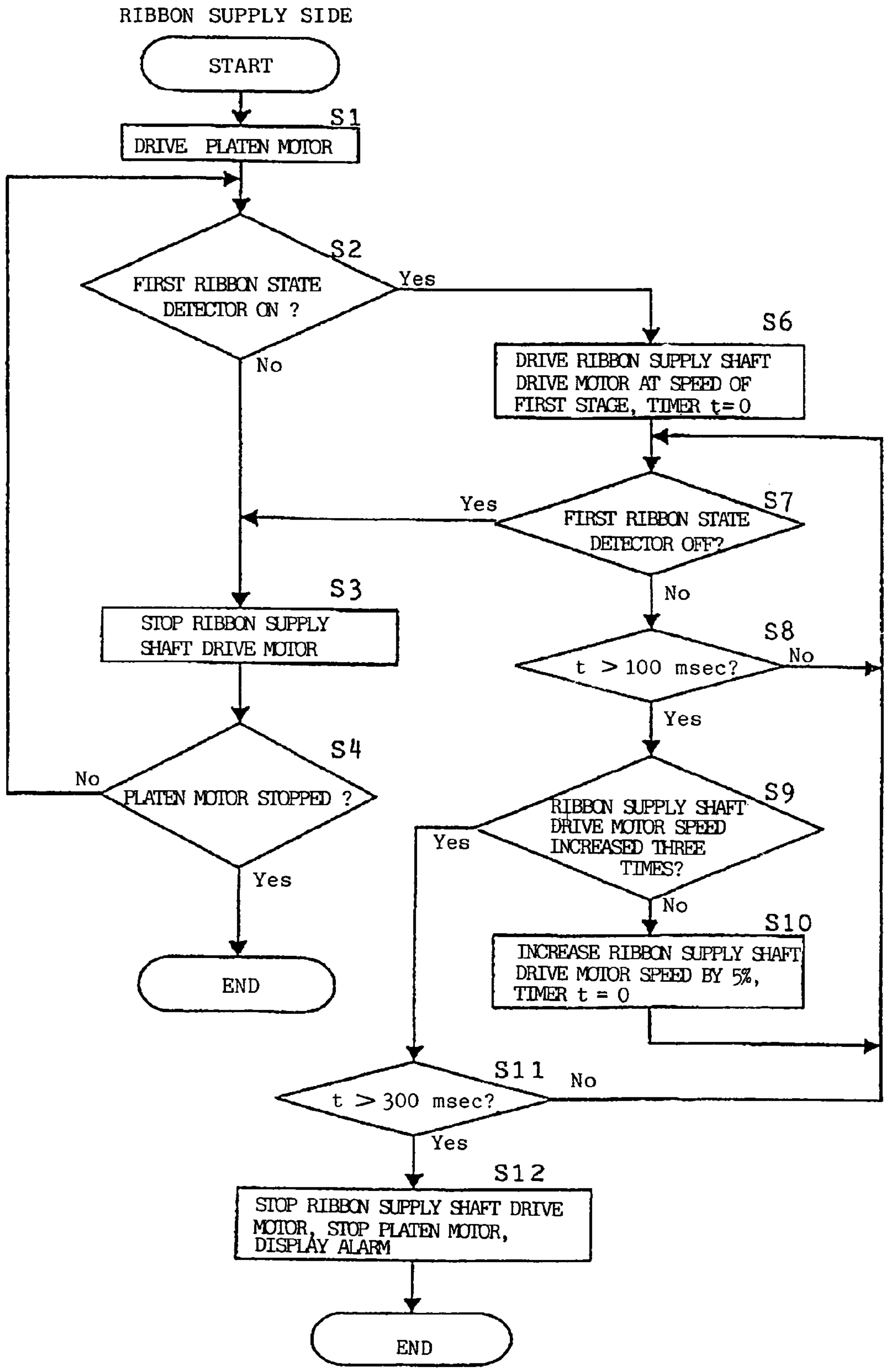
FIG. 5 is a flowchart showing procedures of control on the ribbon supply side of the printer of FIG. 2.

Further, procedures of control on the ribbon supply side of the printer will be described with reference to the flowchart of FIG. 5.

When the printer 1 is driven, the platen motor is driven (Step S1). Then, it is determined whether the output of the first ribbon state detector 11 is on or not (Step S2). If the output is off, it is concluded that the state of ribbon feed in the ribbon supply path is appropriate, and the ribbon supply shaft drive motor 8 is kept stopped (Step S3). Then, whether or not the platen motor is stopped is determined (Step S4).

Since the ribbon 2 is not fed when the platen motor is stopped, the control cycle for the ribbon feed terminates (Step S5). When the platen motor 2 is being driven, on the other hand, the control of the ribbon feed must be continued. Accordingly, the program returns from Step S4 to Step S2, whereupon the ribbon feed control is repeated. The cycle time of this control is 4 milliseconds.

If the output of the first ribbon state detector 11 is on (decision in Step S2 is Yes), on the other hand, the tension of the ribbon in the ribbon path is excessive, so that the ribbon supply shaft drive motor 8 is driven at the first-stage rotational speed (Step S6). At the same time, a timer is reset (t=0) and time measurement is started. Then, whether the output of the first ribbon state detector 11 is off or not is determined (Step S7).

If the output of the first ribbon state detector 11 is off (decision in Step S7 is Yes), the tension of the ribbon 2 is eased so that the ribbon is loose. Therefore, the program proceeds from Step S7 to Step S3, whereupon the rotation of the ribbon supply shaft drive motor 8 is stopped. Processes that follow Step S3 are performed in the same manner as aforesaid.

If the output of the first ribbon state detector 11 is on (decision in Step S7 is No), on the other hand, the processes of Step S8, Step S7, and Step S8 are repeated. If the output of the first ribbon state detector 11 is turned off as these processes are repeated, the program proceeds from Step S7 to Step S3, whereupon the ribbon supply shaft drive motor 8 is stopped. If the output of the first ribbon state detector 11 is not turned off even when this processing is repeated for 100 milliseconds (decision in Step S8 is Yes), on the other hand, the speed of the ribbon supply shaft drive motor 8 is increased by 5% (Step S10) after it is confirmed (Step S9) that the process to increase the speed of the ribbon supply shaft drive motor 8 (process in Step S10) is not performed in the last three cycles. At the same time, the timer is reset (t=0) and time measurement is started, whereupon the program returns to Step S7.

After the process of Step S10 to increase the speed of the ribbon supply shaft drive motor 8, the program returns to Step S7. Then, the processes of Step S8, Step S7, and Step S8 are repeated in the same manner as aforesaid. If the output of the first ribbon state detector 11 is turned off as these processes are repeated, the program proceeds from Step S7 to Step S3, whereupon the ribbon supply shaft drive motor 8 is stopped. If the output of the first ribbon state detector is not turned off even when this processing is repeated for 100 milliseconds, the program proceeds from Step S8 to Step S9. After it is confirmed that the process to increase the speed of the ribbon supply shaft drive motor 8 has not been performed in the last three cycles, the speed of the ribbon supply shaft drive motor 8 is further increased by 5% (Step S10). At the same time, the timer is reset (t=0) and time measurement is started, whereupon the program returns to Step S7.

It is monitored whether or not the first ribbon state detector 11 is turned off in 100 milliseconds after the speed increase of the ribbon supply shaft drive motor 8 by repeating the processes of Step S8 and Step S7 in the aforesaid manner. When the first ribbon state detector 11 is turned off, the program proceeds to Step S3. If the first ribbon state detector 11 is not turned off in 100 milliseconds, on the other hand, the program proceeds from Step S8 to Step S9.

If the first ribbon state detector 11 is not turned off in another 100 milliseconds after a third 5% speed increase of the ribbon supply shaft drive motor 8 in Step S10, the program proceeds from Step S8 to Step S9. Since the process to increase the speed of the ribbon supply shaft drive motor 8 is executed for a third cycle by this stage, the program proceeds from Step S9 to Step S11.

Then, the processes of Step S11, Step S7, Step S8, Step S9, Step S11, and Step S7 are repeated. If the output of the first ribbon state detector 11 is turned off as these processes are repeated, the program proceeds from Step S7 to Step S8, whereupon the ribbon supply shaft drive motor 8 is stopped. If the output of the first ribbon state detector is not turned off (decision in Step S11 is Yes) even when these processes are repeated for 300 milliseconds after the start of time measurement in Step S10, on the other hand, the program proceeds from Step S11 to Step S12. Then, an alarm is displayed to inform an operator of an abnormal state, and the ribbon supply shaft drive motor 8 and the platen motor are stopped, whereupon the processes are finished.

Figure 6:
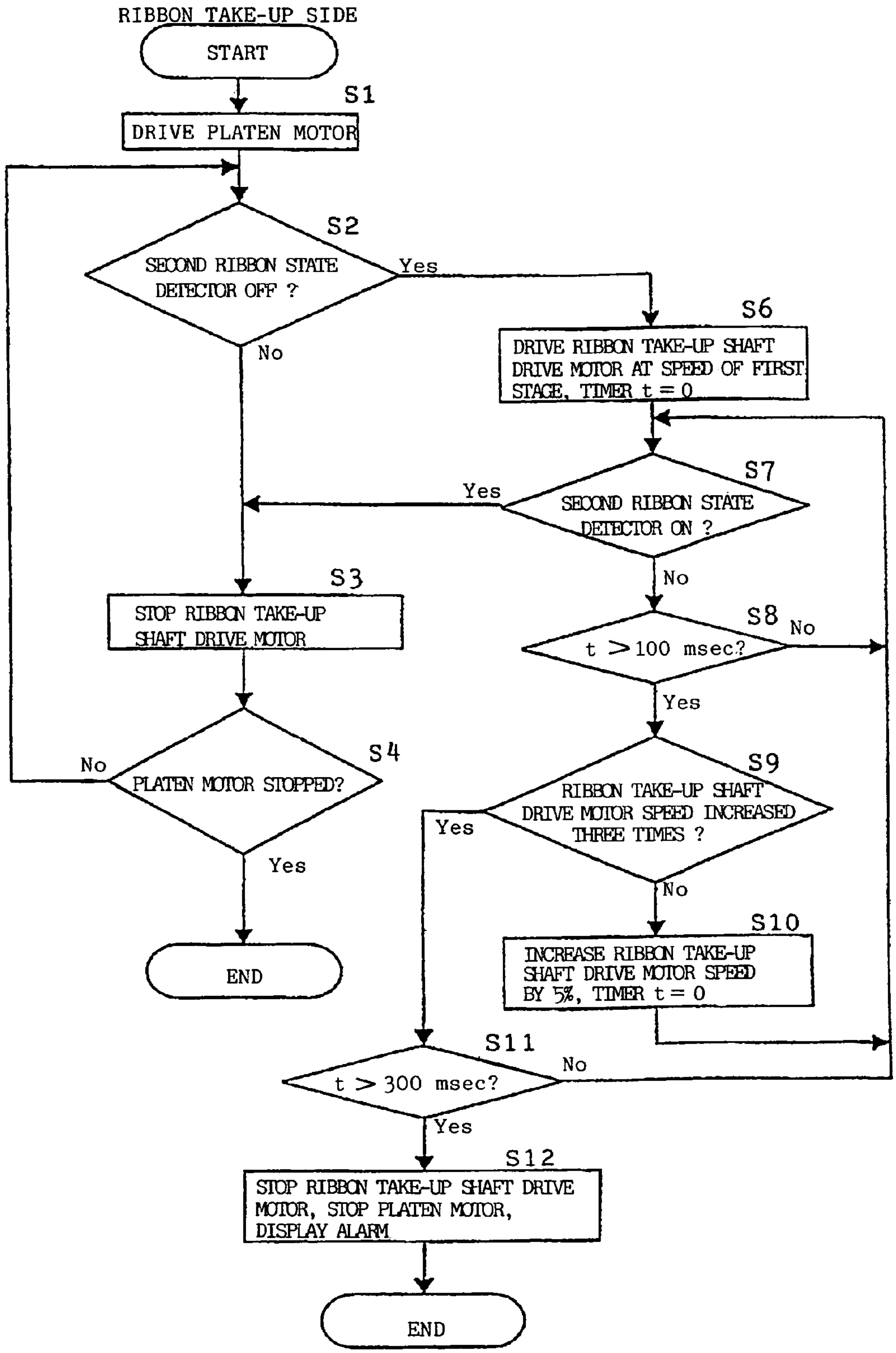
FIG. 6 is a flowchart showing steps of procedure of control on the ribbon take-up side of the printer of FIG. 2.

Procedures of control on the ribbon take-up side of the printer are shown in the flowchart of FIG. 6.

In the procedures of control on the ribbon take-up side, characteristics on the take-up side require setting such that the ribbon take-up shaft drive motor 10 is stopped when the ribbon 2 is tensioned and that the motor 10 is driven when the ribbon 2 is loose. Thus, the procedures are basically the same as the control procedures on the ribbon supply side shown in the flowchart of FIG. 5 provided that the decision in Step S2 is Yes if the output of the second ribbon state detector 12 is off and that the decision in Step S7 is Yes if the output of the second ribbon state detector 12 is on. Accordingly, a detailed description of the control procedures on the ribbon take-up side is omitted.

In the embodiment described above, controls of the same kind are applied to both the ribbon supply path and the ribbon take-up path. Alternatively, however, the control as described above may be applied only to the ribbon take-up path while the ribbon supply path may be controlled by using a slip mechanism that is given an appropriate resistance for preventing a slip. In this case, the ribbon supply roll 3 can be prevented from rotating by the force of inertia as the ribbon is drawn out by the platen.

The invention claimed is:

1. A printer comprising:

a thermal head which transfers ink applied to an ink ribbon onto a recording medium, thereby printing print data, a platen which is located opposite the thermal head and conveys the ink ribbon and the recording medium between the platen and the thermal head, a ribbon supply shaft which supports an ink ribbon supply roll, a ribbon take-up shaft, which supports an ink ribbon take-up roll, and on which the ink ribbon is wound up after printing, a stepping motor for a ribbon take-up shaft drive which drives the ribbon take-up shaft, a tension arm located in a ribbon path between the thermal head and the ribbon take-up shaft in a manner such that the tension arm is urged in a loosening direction of the ribbon, and a detector for detecting a displacement of the tension arm, in which the stepping motor for the ribbon take-up shaft drive is stopped or driven according to an output of the detector, wherein if the detector determines that the ink ribbon is loose, the stepping motor for the ribbon take-up shaft drive is initially driven at a predetermined speed, if the detector determines that the ink ribbon remains loose after a first predetermined time interval starting from the start of the stepping motor, the stepping motor continues operating at current stepping motor speed, if the detector determines that the ink ribbon remains loose after a second predetermined time interval starting from the start of the stepping motor, the speed of the stepping motor is increased, alternatively, if the detector determines that the ink ribbon is in tension, the stepping motor is stopped until the detector next determines that the ink ribbon is loose.

2. The printer according to claim 1, wherein control for increasing the drive speed of the stepping motor for the ribbon take-up shaft drive is repeated step by step.

3. The printer according to claim 2, wherein if the output of the detector has not changed even though set step-by-step control for increasing the drive speed of the stepping motor for ribbon take-up shaft drive is repeated predetermined number of times, then a drive of said platen is stopped.

4. A printer comprising a thermal head which transfers ink applied to an ink ribbon onto a recording medium, thereby printing print data, a platen which is located opposite the thermal head and conveys the ink ribbon and the recording medium between the platen and the thermal head, a ribbon supply shaft, which supports an ink ribbon supply roll, and on which the ink ribbon is wound, a stepping motor for a ribbon supply shaft drive which drives the ribbon supply shaft, a ribbon take-up shaft, which supports an ink ribbon take-up roll, and on which the ink ribbon is wound up after printing, a stepping motor for a ribbon take-up shaft drive which drives the ribbon take-up shaft, tension arms respectively located in a ribbon path between the ribbon supply shaft and the thermal head and in a ribbon path between the thermal head and the ribbon take-up shaft in a manner such that the tension arms are urged in a loosening direction of the ribbon, and detectors for detecting a displacement of the tension arms, in which the stepping motor for the ribbon supply shaft drive and the stepping motor for the ribbon take-up shaft drive are stopped or driven according to an output of the detectors, wherein the stepping motor for the ribbon supply shaft drive and the stepping motor for the ribbon take-up shaft drive are driven at respective predetermined speeds, when the respective stepping motors start, and during a predetermined time interval starting from the start of the stepping motor for the ribbon supply shaft drive or the start of the stepping motor for the ribbon take-up shaft drive, the detectors corresponding to each stepping motor produce an output, and the outputs of the detectors are monitored to determine whether the output of either detector changes during the predetermined time interval, and if it is determined that the output of either one of the detectors has not changed during the predetermined time interval, then the stepping motor for the ribbon supply shaft drive and stepping motor for the ribbon take-up shaft drive are driven at speeds obtained by adding their respective predetermined speed to a respective predetermined speed increment, but if it is determined that the output of either one of said detectors has changed then the corresponding motor is stopped.

5. The printer according to claim 4, wherein control for increasing the drive speed of the stepping motor for the ribbon supply shaft drive and the stepping motor for the ribbon take-up shaft drive is repeated step by step.

6. The printer according to claim 5, wherein if the output of any one of the detectors has not changed even though set step-by-step control for increasing the drive speed of the stepping motor for ribbon supply shaft drive or the stepping motor for ribbon take-shaft drive is repeated predetermined number of times, then a drive of said platen is stopped.

* * * * *